(12) United States Patent
Ciesielski et al.

(10) Patent No.: US 10,793,699 B2
(45) Date of Patent: Oct. 6, 2020

(54) CELLULOSE-BASED COMPOSITES AND METHODS OF MAKING THE SAME

(71) Applicant: Alliance for Sustainable Energy, LLC, Golden, CO (US)

(72) Inventors: Peter N. Ciesielski, Arvada, CO (US); Ruoran Zhang, Lakewood, CO (US); Michael E. Himmel, Littleton, CO (US); Andrew Nolan Wilson, Denver, CO (US); Mark R. Nimlos, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 15/902,429

(22) Filed: Feb. 22, 2018

(65) Prior Publication Data

US 2018/0291183 A1    Oct. 11, 2018

Related U.S. Application Data

(60) Provisional application No. 62/477,197, filed on Mar. 27, 2017, provisional application No. 62/462,071, filed on Feb. 22, 2017.

(51) Int. Cl.
*C08L 1/02* (2006.01)
*C08K 5/098* (2006.01)
*C08K 5/19* (2006.01)

(52) U.S. Cl.
CPC ............... *C08L 1/02* (2013.01); *C08K 5/098* (2013.01); *C08K 5/19* (2013.01); *C08L 2203/12* (2013.01)

(58) Field of Classification Search
CPC ....... C08L 1/02; C08L 2203/12; C08K 5/098; C08K 5/19
See application file for complete search history.

(56) References Cited

U.S. PATENT DOCUMENTS

| 8,829,110 B2 | 9/2014 | Hamad et al. |
| 2013/0313477 A1 | 11/2013 | Beck et al. |
| 2014/0011722 A1 | 1/2014 | Garner |
| 2016/0024264 A1 | 1/2016 | Hamad et al. |

FOREIGN PATENT DOCUMENTS

WO    WO 2014/179881 A1    11/2014

OTHER PUBLICATIONS

Cheng et al., "Water-soluble Nanocrystalline Cellulose Films with Highly Transparent and Oxygen Barrier Properties", Nanoscale, 2016, vol. 8, pp. 973-978.
Fortunati et al., "Processing of PLA nanocomposites with cellulose nanocrystals extracted from *Posidonia oceanica* waste: Innovative reuse of coastal plant", Industrial Crops and Products, 2015, vol. 67, pp. 439-447.
Hasani et al., "Cationic Surface Functionalization of Cellulose Nanocrystals", Soft Matter, 2008, vol. 4, pp. 2238-2244.
Kelly et al., "Large, Crack-Free Freestanding Films with Chiral Nematic Structures", Advanced Optical Materials, 2013, vol. 1, pp. 295-299.
Lagerwall et al., "Cellulose nanocrystal-based materials: from liquid crystal self-assembly and glass formation to multifunctional thin films", NPG Asia Materials, 2014, vol. 6, e80, pp. 1-12.
Miura et al., "Glycopolymer Nanobiotechnology", Chemical Reviews, 2016, vol. 116, pp. 1673-1692.
Mu et al., "Formation of Chiral Nematic Films from Cellulose Nanocrystal Suspensions Is a Two-Stage Process", Langmuir, 2014, vol. 30, No. 31, pp. 9256-9260.
Pullawan et al., "Deformation Micromechanics of All-cellulose Nanocomposites: Comparing Matrix and Reinforcing Components", Carbohydrate Polymers, 2014, vol. 100, pp. 31-39.
Zaman et al., "Synthesis and Characterization of Cationically Modified Nanocrystalline Cellulose", Carbohydrate Polymers, 2012, vol. 89, pp. 163-170.

*Primary Examiner* — Edward J Cain
(74) *Attorney, Agent, or Firm* — Sam J. Barkley; Michael A. McIntyre

(57) ABSTRACT

Disclosed herein are a cellulose particle and a binder, where the cellulose particle has a cellulose core and a surface group, and the binder interacts with the surface group to form a composite.

5 Claims, 16 Drawing Sheets

CELLULOSE-BASED COMPOSITES AND METHODS OF MAKING THE SAME

CROSS-REFERENCE TO RELATED APPLICATIONS

This application claims priority from U.S. Provisional Application No. 62/462,071, filed Feb. 22, 2017, and from U.S. Provisional Application No. 62/477,197, filed Mar. 27, 2017 the disclosures of which are incorporated herein by reference in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

SUMMARY

An aspect of the present disclosure is a composition that includes a cellulose particle and a binder, where the cellulose particle has a cellulose core and a surface group, and the binder interacts with the surface group to form a composite. In some embodiments of the present disclosure, the cellulose core can include at least one of a cellulose crystal and/or a cellulose fibril. In some embodiments of the present disclosure, the cellulose crystal can have a characteristic length between about 100 nm and 1000 nm. In some embodiments of the present disclosure, the cellulose fibril can have a characteristic length between about 1 μm and 100 μm. In some embodiments of the present disclosure, the cellulose fibril can have a characteristic width between about 3 nm and 500 nm. In some embodiments of the present disclosure, the surface group can be positively charged, negatively charged, neutral, or a combination thereof. In some embodiments of the present disclosure, the surface group can be positively charged and include at least one of an ammonium group, a trimethyl ammonium group, a triethyl ammonium group, and/or a stabilized carbocation. In some embodiments of the present disclosure, the surface group can be negatively charged and include at least one of a carboxylate group, a nitrate group, a sulfate group, a phosphate group, and/or a silicate group. In some embodiments of the present disclosure, the surface group can be neutral and include at least one of a carboxyl group, a methoxy group, an alkyl group, an alkenyl group, a phenyl group, a carbonyl group, an aldehyde group, an azide group, an isonitrile group, and/or a halogen group. In some embodiments of the present disclosure, the composite can be in the form of at least one of a film, a gel, a foam, and/or a bulk composite. In some embodiments of the present disclosure, the film can have a thickness between 100 nm and 2 mm.

An aspect of the present disclosure is a method that includes mixing a cellulose particle, a binder, and/or a solvent to produce a solution, and treating the solution such that at least a portion of the solvent is removed to produce a film that includes the cellulose particle and the binder. In some embodiments of the present disclosure, the solvent can be selected such that the cellulose particle and/or the binder are at least partially soluble in the solvent. In some embodiments of the present disclosure, the solvent can be polar. In some embodiments of the present disclosure, the solvent can be at least one of water, ethanol, methanol, and/or phenol. In some embodiments of the present disclosure, the solvent can be nonpolar. In some embodiments of the present disclosure, the solvent can include an alkane. In some embodiments of the present disclosure, the solvent can include at least one of benzene and/or hexane. In some embodiments of the present disclosure, the treating can include evaporating the solvent. In some embodiments of the present disclosure, the evaporating can be performed at a temperature greater than 20° C. In some embodiments of the present disclosure, the evaporating can be performed at a temperature between 20° C. and 250° C.

BRIEF DESCRIPTION OF THE DRAWINGS

Some embodiments of the present disclosure are depicted in referenced figures of the drawings. It is intended that the embodiments and figures disclosed herein are to be considered illustrative rather than limiting.

REFERENCE NUMBERS

Figure 1:
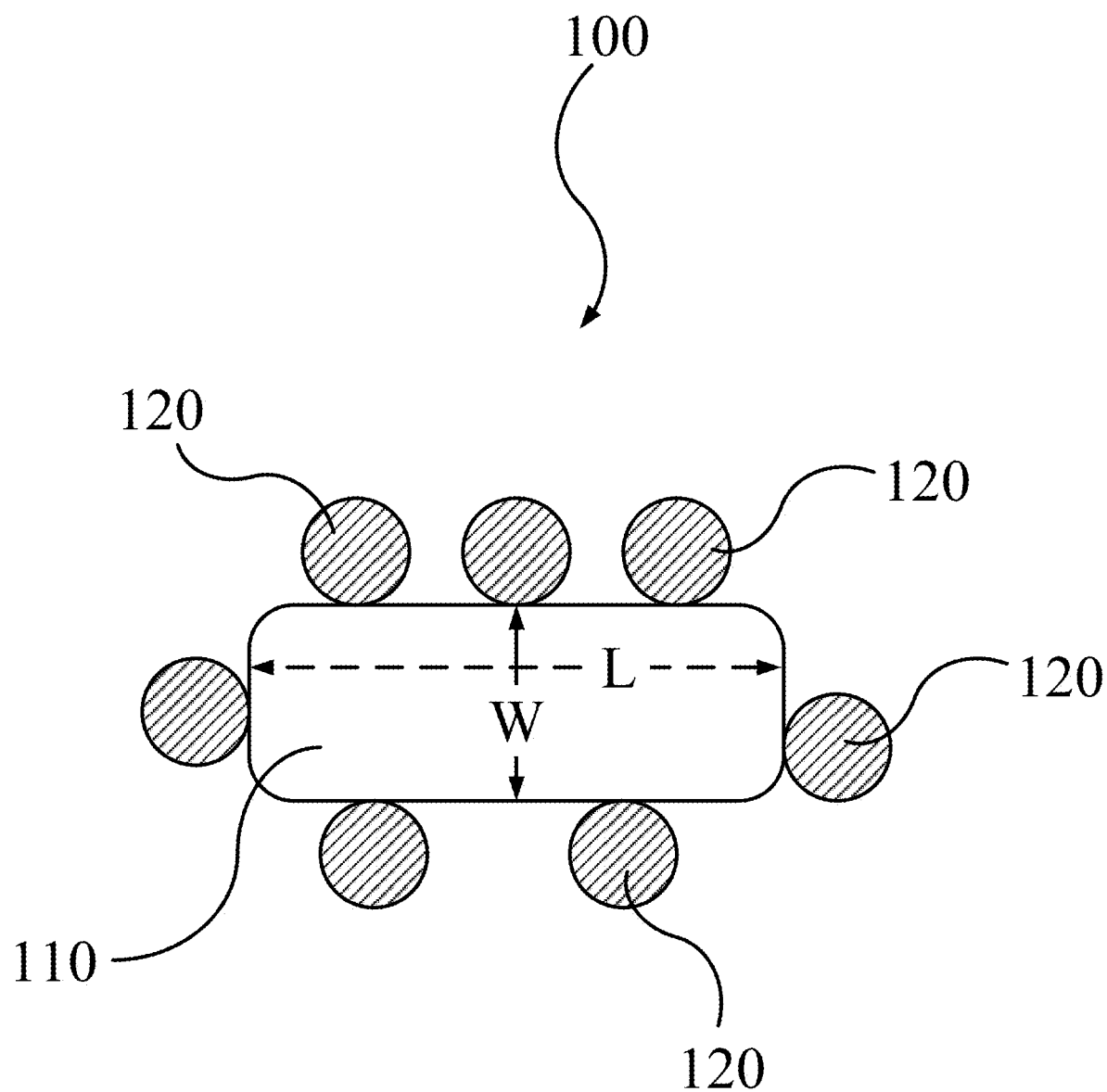
FIG. 1 depicts a cellulose nanoparticle having a cellulose core and surface groups, according to some embodiments of the present disclosure.

100 . . . cellulose particle
110 . . . cellulose core
120 . . . surface group
200 . . . composition
210 . . . binder
220 . . . composite
300 . . . method
310 . . . solvent
320 . . . mixing
322 . . . solution
330 . . . applying
332 . . . intermediate
340 . . . reacting
350 . . . treating

DETAILED DESCRIPTION

The present disclosure relates to composite materials constructed using at least cellulose particles and a binder. In some embodiments of the present disclosure, the cellulose particles can include at least one of cellulose nanofibers and/or cellulose nanocrystals where cellulose nanofibers are generally described as extremely high-aspect ratio nanostructures consisting of elementary cellulose fibrils or bundles thereof with diameters ranging from a few to several hundred nanometers and lengths ranging from to several microns to tens of microns and nanocrystals are described as shard-like, highly crystalline cellulose fragments with diameters ranging from 3 to 10 nm and lengths from 50 to 500 nm.

As described herein, novel composite materials have been manufactured where the composites have been composed purely of carbohydrate components and their surface-modified derivatives. In some embodiments, the surface-modified derivatives are modified by functional groups, also referred to as groups. The optical and mechanical properties of these composites are tunable by modulating the proportions of the various carbohydrate components. These renewable materials can be recycled indefinitely via an aqueous dissolution and re-casting process and can serve as functional replacements for petroleum-derived polymeric materials as well as enabling new materials applications.

Glycopolymeric composites were fabricated by the aqueous combination of cellulose nanocrystals (CNCs) and nanofibrils (CNFs) that were modified to have either positive or negative surface charges immobilized on the cellulose particles' surface groups. It is also shown herein that mediating glycans and monomeric sugars can be used to further tune the properties of the composite materials. Both negatively charged CNCs (n-CNCs) and CNFs (n-CNFs) and positively charged CNCs (p-CNCs) and CNFs (p-CNFs) were tested, with some cellulose particle surfaces modified using, for example glycidyltrimethylammonium chloride. Mixtures of the n-CNCs and p-CNCs formed strong, electrostatically-driven composites when cast from solution. The resultant optical and mechanical properties of the films are shown herein to be dependent on the relative proportions of positively and negatively charged cellulose nanoparticles, as well as binder components, for example, glycans and sugars.

Examples of several composite materials fabricated, according to embodiments of the present disclosure include: a) a 1:1 (charge neutral) mixture of p-CNCs to n-CNCs that formed a strong but brittle material similar to a bulk salt crystal; b) a 1:1 (charge neutral) mixture of p-CNCs to n-CNCs with 30 weight % glucose (binder) that formed a strong composite material with increased pliability compared to the pure 1:1 CNC mixture; and c) a mixture of pure p-CNCs with 30 weight % glucose (binder) that formed a pliable composite film with optical transparency and clarity (appearing similar to transparent glass). In some embodiments of the present disclosure, composite constructed of cellulose particles and binder can be resuspended into a solution at ambient conditions simply by adding water to the films. These solutions can subsequently be treated a second time to reform a dry composite by recasting and allowing the water (solvent) to evaporate. This functionality imparts facile recovery and recycling properties indefinitely and with minimal processing for the materials disclosed herein.

In some embodiments of the present disclosure, molecules and compounds suitable for use as a binder in a cellulose particle/binder composite can be obtained from processes used in a biomass processing facility, for example a pyrolysis plant such as a catalytic fast pyrolysis (CFP) plant. Thus, the present disclosure describes reinforced polymer composites resulting from the copolymerizing of compounds/molecules resulting from CFP with nanocellulosic materials such as CNCs and CNFs as described above. Compounds that partition into the aqueous phase of CFP bio-oil are particularly well suited as binders for integration with nancellulose due to their inherent amphiphilicity. Furthermore, aqueous-phase CFP compounds are underutilized or treated as a waste product due to their high oxygen content. Therefore, valorizing these compounds as a matrixing polymer (binder) for cellulosic composites enhances the economic feasibility of a CFP process, or other pyrolysis process in general, while producing cellulose particle/binder composites of renewable components.

Cyclopentenone, a dominant carbonaceous component of the aqueous phase of CFP bio-oil, can be combined as a binder with cellulose particles (e.g. nanocrystals) to produce a flexible, durable polymer composite. The bulk properties of the resultant composite are dependent on the surface modification of the cellulose particles. In an embodiment, a procedure for preparing such a polymer composite includes the following: 1) an aqueous solution of cyclopentenone (binder) extracted from CFP bio oil is combined with an aqueous suspension of cellulose particles to form a miscible mixture; 2) this mixture is then deposited on a substrate and exposed to UV irradiation to promote cross-linking; and 3) water can is then removed from the composite by evaporating, either concurrently with the cross-linking, and/or subsequently, resulting in the final composite in the form of a film. The resultant films produced using this example of a method for manufacturing a cellulose particle/binder composite were flexible and semitransparent depending on the CNC surface modification and CNC/cyclopentenone ratio. Based on these results, similar procedures can be used to form other composites using other CFP products such as propane diol, furanics, and/or oxygenated aromatics. This example shows that a binder (e.g. a molecule and/or compound) can interact either electrostatically with the composite cellulose particles and/or the binder can react to form covalent bonds linking the cellulose particles to the binder.

FIG. 1 illustrates a cellulose particle 100 that includes a cellulose core 110 and at least one surface group 120, according to some embodiments of the present disclosure. The cellulose core 110 can be a cellulose crystal and/or a cellulose fibril. In some embodiments of the present disclosure, the cellulose core 110 can be a cellulose nanocrystal and/or a cellulose nanofibril. A cellulose nanocrystal can have a characteristic length (L) between about 10 nm and about 2000 nm, or between about 100 nm and about 1000 nm. A cellulose nanofibril can have a characteristic length (L) between about 500 nm and about 500 µm, or between about 1 µm and about 100 µm, and a characteristic width (W) between about 1 nm and about 1000 nm, or between about 3 nm and about 500 nm. Thus, the cellulose core 110 can have the shape of a rod, tube, and/or cylindrical structure having an aspect ratio (e.g. width/length) between 10 and 10000, where the actual aspect ratio can depend on the source of the cellulose particle 100. In an embodiment, a cellulose core 110 can be provided in a non-cylindrical shape as required for a particular final composite and/or product.

The surface group 120 can have an overall charge, either positive and/or negative, and/or a surface group 120 can be neutral. As used herein, the term "surface group" can refer to functional groups and/or moieties. The surface group 120 can be covalently bound to the cellulose core 110 and/or the surface group 120 can be bound to the cellulose core 100 electrostatically. Examples of positively charged surface groups 120 include an ammonium group, a trimethyl ammonium group, a triethyl ammonium group, a stabilized carbocation, and/or combinations thereof. Examples of negatively charged surface groups 120 include a carboxylate group, a nitrate group, a sulfate group, a phosphate group, a silicate group, and/or combinations thereof. Examples of neutral surface groups 120 include a carboxyl group, a methoxy group, an alkyl group, an alkenyl group, a phenyl group, a carbonyl group, an aldehyde group, an azide group, an isonitrile group, a halogen group, and/or combinations thereof. Other surface groups 120 can be selected depending on the final target composite and/or final product.

Figure 2:
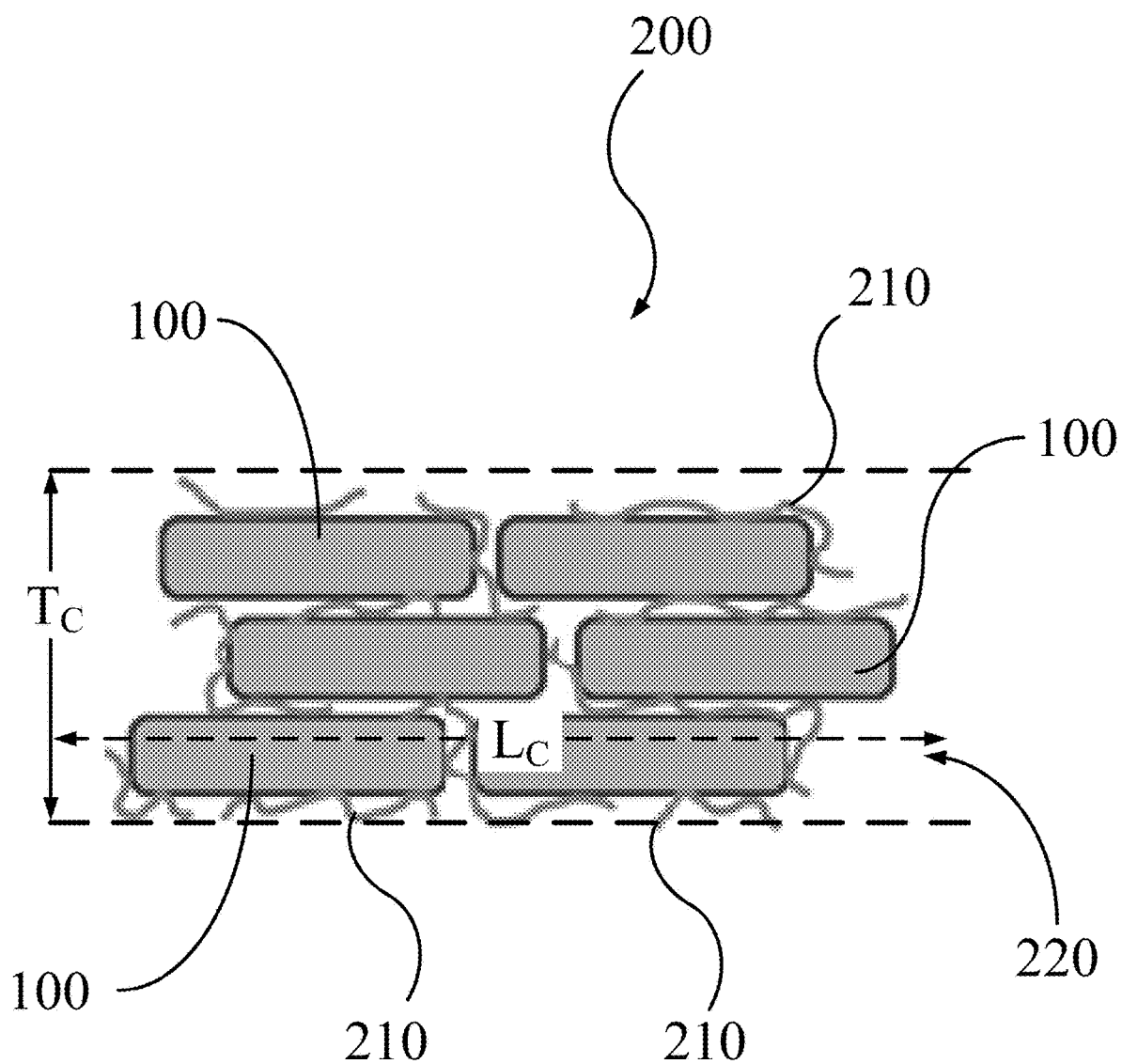
FIG. 2 depicts a composition that includes cellulose particles and binder, resulting in a composite in the form of a film, according to some embodiments of the present disclosure.

FIG. 2 illustrates a composition 200 that includes cellulose particles 100 mixed with a binder 210 to form a composite 220, such that, as shown in this example, the composite 220 can be in the form of a film. Compositions 200 can be constructed in any other desirable shape and/or form including a gel, a foam, and/or a bulk composite. FIG. 2 illustrates the cellulose particles 100 aligned with their long axes (e.g. length dimensions) parallel to one another and substantially perpendicular to the thickness dimension ($T_C$) of the composite 220 film. However, in some embodiments of the present disclosure, the long axes of the cellulose particles 100 can be aligned substantially perpendicular to the length dimension ($L_C$) of the composite 220 film. In some embodiments of the present disclosure, the cellulose particles 100 can be randomly aligned within a composite 200 and/or substantially aligned relative to a reference axis (e.g. a composite 220 reference axis). Thus, as illustrated in the example of FIG. 2, a composite 220 can have a characteristic length ($L_C$) and/or thickness ($T_C$) and/or width. Composite 220 films can be produced having surface areas (product of the characteristic length ($L_C$) and width between about 0.01 $m^2$ and about 1 $m^2$. Again, for the case of a composite 220 film, a composite 220 film can have a thickness between about 10 nm and about 5 mm, or between about 100 nm and about 2 mm. In some embodiments of the present disclosure, a composite 220 film can be produced that is flexible, elastic, and/or substantially transparent to light in the visible part of the spectrum.

Referring again to FIG. 2, the binder 210 is depicted as being some molecule and/or molecules such as polymers and/or oligomers. In an embodiment, a binder 210 can include at least one of a polymer, an oligomer, a peptide, a polypeptide, a sugar (e.g. glucose), a protein, a carbohydrate, a fatty acid, a lipid, and or any suitable small molecule (e.g. cyclopentenone, glycerol, citric acid). In some embodiments, the binder 210 can be obtained from biomass and/or some other renewable source, and/or the binder 210 can be obtained from more traditional sources (e.g. petroleum). The binder 210 can form covalent and/or non-covalent connections between adjacent and/or neighboring cellulose particles 100 such that the binder 210 physically "binds" and/or chemically "crosslinks" the cellulose particles 100 together to form the composite 220. Thus, in some embodiments of the present disclosure, the binder 210 can form an interconnected network of binder 210 molecules (e.g. polymers, oligomers, peptides, etc.) that physically and/or chemically hold a plurality of cellulose particles 100 together to form the composite 220 having structural integrity, strength, and/or durability. Such a network of binder 210 molecules can also be viewed as a glue, scaffold, or matrix of binder 210 molecules that holds the individual cellulose particles 100 (e.g. bricks) together into the desired solid, structured composite 220 (e.g. film). In some embodiments of the present invention, the binder 210 can form a film and/or layer of binder 210 between adjacent/neighboring cellulose particles 100, resulting in the composite 220. As describe above, the binder 210 can provide covalent and/or electrostatic connections between the cellulose particles 100. In some embodiments of the present disclosure, the binder 210 molecules themselves can react with each other during the formation of the composite 220, for example by polymerizing, cross-linking, etc. In some embodiments of the present disclosure, the binder 210 molecules themselves can react with the cellulose particles 100 each during the formation of the composite 220, for example by polymerizing, cross-linking, etc.

Figure 3:
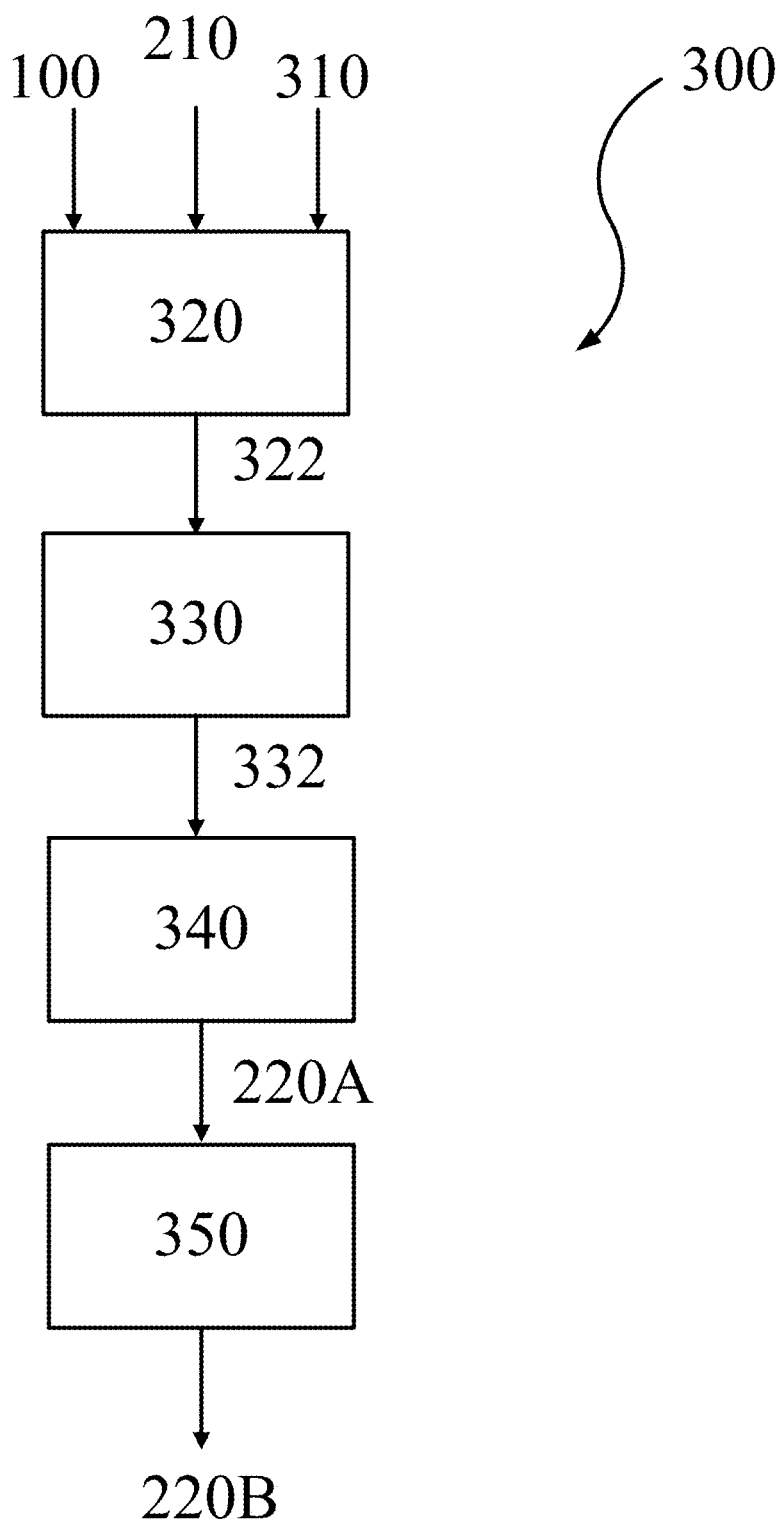
FIG. 3 depicts a method for making cellulose particle, binder composites, according to some embodiments of the present disclosure.

FIG. 3 is an example of a method 300 for producing a composite 220 constructed of a mixture of cellulose particles 100 and binder 210, as described above. The method 300 can begin with the mixing 320 of the cellulose particles 100, the binder 210, and/or a solvent 310. In some embodiments of the present disclosure, the solvent 310 is not needed, for example, if the binder 210 provides a sufficiently low viscosity and sufficiently high solubility/miscibility for the cellulose particles that the downstream steps of the method 300 can still be successfully performed. For example, the binder 210 can initially have a relatively low viscosity; however, during subsequent steps (e.g. reacting) the binder 210 can polymerize to form a solid matrix containing the cellulose particles 100. In other examples, a solvent 310 can facilitate better downstream processing of the cellulose particles 100 and the binder 210 and can result in better physical properties of the final composite 220; e.g. a desired alignment of the cellulose particles 100 within the composite 220. FIG. 3 indicates the mixing 320 of three separate streams, cellulose particles 100, binder 210, and solvent 310. However, it should be understood that other schemes fall within the scope of the present disclosure. For example, the cellulose particles 100 can be mixed with a first solvent in a first mixing operation and the binder 210 can be mixed with a second solvent in a second mixing operation, with the two resultant solutions/mixtures subsequently combined in a third mixing operation. The actual method/process for initially combining and mixing the substituent components (cellulose nanoparticles and binder) to produce the target composite 220 is determined by the target physical properties and performance characteristics of the final target composite 220.

In an embodiment, the mixing 320 results in a solution 322 containing the cellulose particles 100, the binder 210, and/or the solvent 310. The method 300 can then proceed with the applying 330 of the solution 322 to a substrate (not shown) that can facilitate downstream processing. For example, the applying 330 can include spin-coating, dip coating, curtain coating, and/or any other solution-phase processing technique of the solution 322 onto the substrate to form a layer of the solution 322 on the substrate. A substrate can be in the form of a flat surface and/or a substrate can provide a three-dimensional mold of the final shape desired for the final composite 220. In some embodiments of the present disclosure, the substrate can be subsequently removed from the final target composite 220 or the substrate can be an integral component of the final product being manufactured. Thus, the applying 330 can result in an intermediate 332 that includes the first solution and a substrate. The intermediate 332 resulting from the applying 330 can then be directed to an optional reacting 340 step. For example, the reacting 340 can polymerize, cross-link, and/or perform any other desired reacting of the at least one of the cellulose particles 100 and/or the binder 210. In some embodiments of the present invention, the intermediate 332 can be heated and/or exposed to electromagnetic radiation and/or a chemical polymerization initiator resulting in at least one of the polymerizing, cross-linking, and/or reacting of the at least one of the cellulose particles 100 and/or the binder 210. In addition, the reacting 340 can also result in the removal of at least a portion of the solvent 310, such that the product from the reacting 340 is the final targeted composite 220A.

In an embodiment, the product (e.g. an intermediate composite 220A) resulting from the reacting 340 can require a subsequent treating 350, where the treating 350 provides additional processing needed to produce the final targeted composite 220B. Thus, in some embodiments of the present disclosure, the treating 350 can include the evaporating of the solvent 310, resulting in a vapor-phase stream of the solvent (not shown) exiting the treating 350. The evaporating can be accomplished by exposing either the intermediate 332 and/or the composite 220A resulting from the reacting 340 to either a flow of gas, a reduced pressure environment (vacuum), and/or a heat source to drive the evaporation of the solvent. For example, the evaporating can be accomplished in an air environment at ambient temperatures (e.g. between about 20° C. and 35° C.) and/or the evaporating can be accomplished by heating either the intermediate 332 and/or the intermediate composite 22A to a temperature greater than 35° C., or to a temperature between 20° C. and 250° C. In any of the aforementioned evaporation processes, the intermediate 332 and/or the intermediate composite 22A can be exposed to pressures below the vapor pressure of the solvent at the present temperature (e.g., pressures less than about 23 torr for water at 25° C.) in order to accelerate evaporation. Thus, in some embodiments of the present disclosure, the reacting 340 can be performed in a step separate from the treating 350, or the reacting 340 can be performed substantially simultaneously with treating. FIG. 3 illustrates the reacting 340 being performed prior to the treating 350, however, other examples can perform the treating 350 prior to the reacting 340. In addition, a method can include only one of the treating 350 or the reacting 340 steps. In some embodiments of the present disclosure, the solvent can be recycled from at least one of the reacting 340 or the treating 350 (not shown) to one or more of the mixing steps described above (e.g. 320).

EXAMPLES

Figure 4:
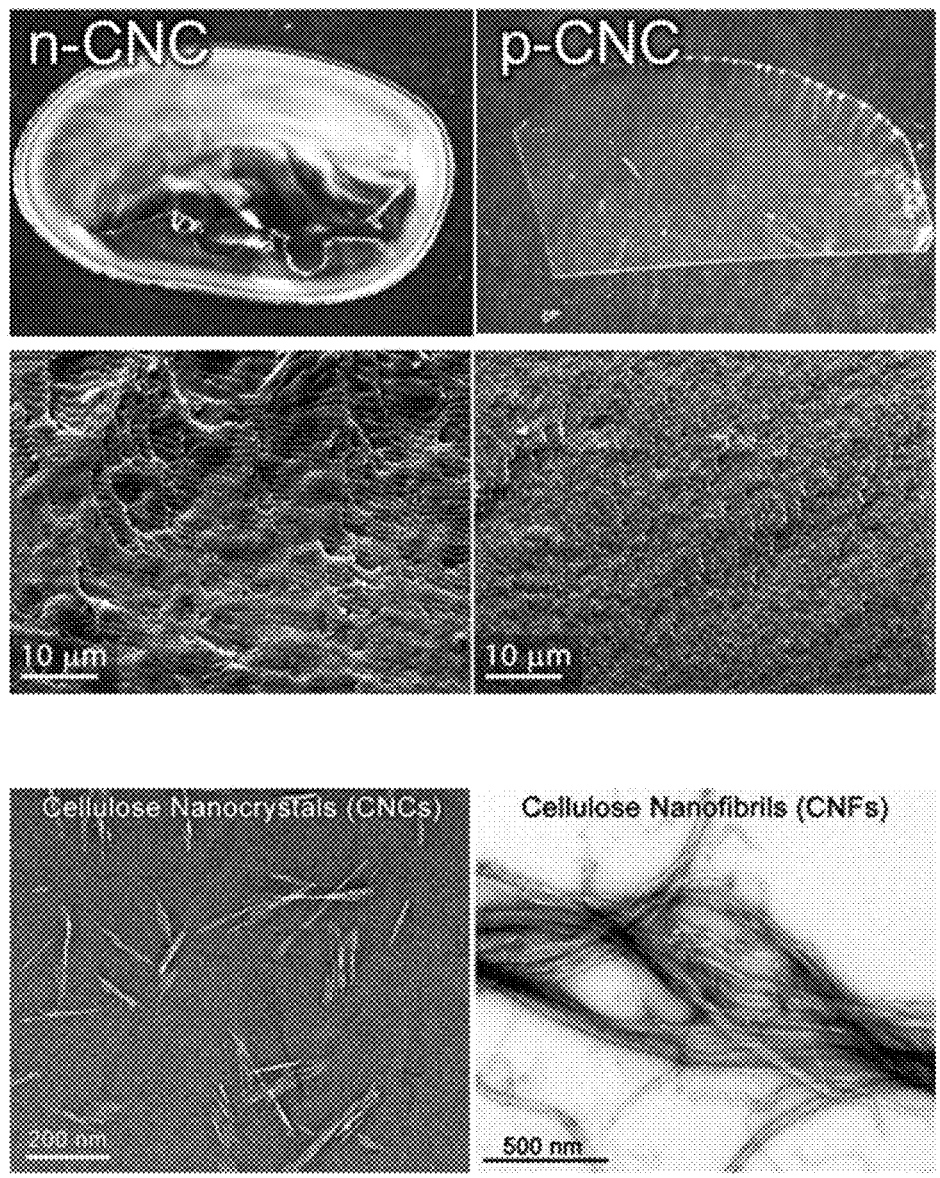
FIG. 4 is a schematic depiction of a "brick-and-mortar" composite material, according to some embodiments of the present disclosure. The depicted compositions include cellulose particles, for example at least one of cellulose nanocrystals and/or nanofibrils and a binder including various plant-derived monomers and polymers. Images in the top panel demonstrate that the meso-structure and optical properties can be successfully altered by changing the surface charge of cellulose nanocrystals used in the assembly (n-CNC, negatively charged cellulose nanocrystal; p-CNC positively charged cellulose nanocrystal).

As indicated above, the present disclosure relates to compositions and/or materials constructed from nanocellulose particles and various plant-derived binders including monomeric and oligomeric sugars, polysaccharides, and small molecular products of biomass conversion processes. In an embodiment, manufactured examples thereof are depicted in FIG. 4. Similarly, composite structures were prepared that utilized nanocellulose particles of various geometries and surface functionalities analogous to the "brick" components of the composite, and other plant-derived matrixing molecules analogous to the "mortar" components (e.g. the binder).

Figure 5:
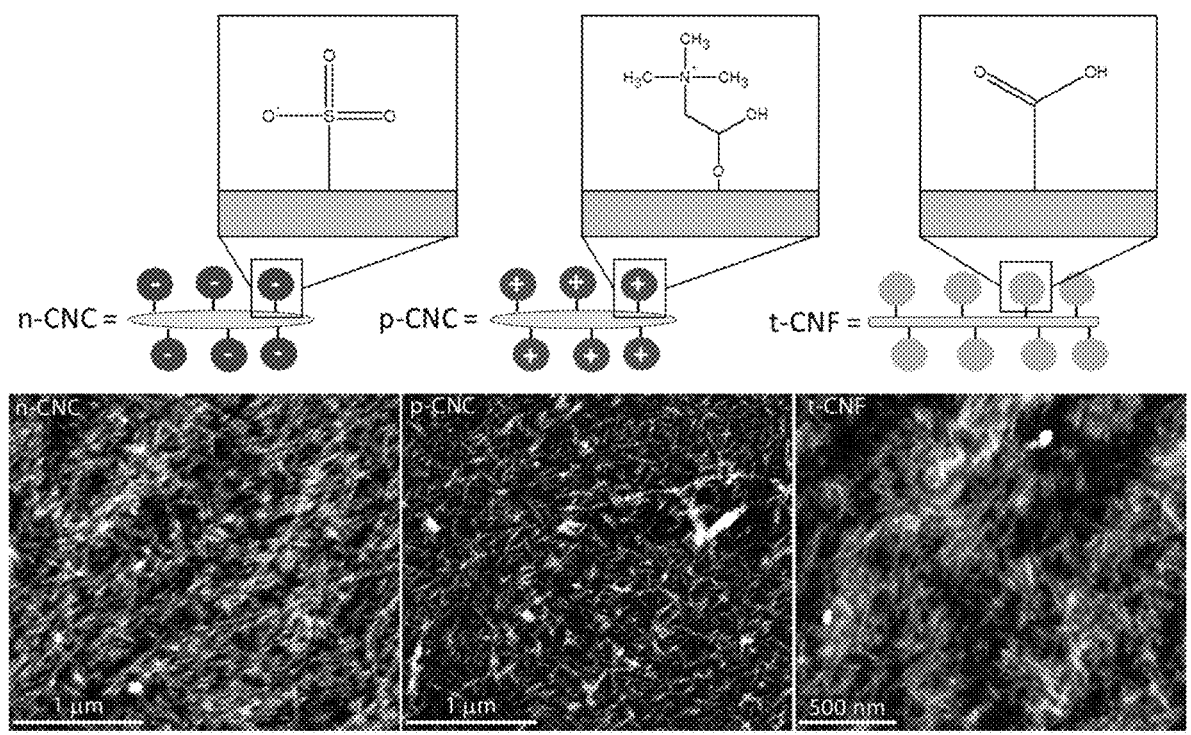
FIG. 5 depicts atomic force microscopy (AFM) images of surface-functionalized cellulose nanoparticles, according to some embodiments of the present disclosure. Top row: schematics depicting various surface functionalities on nanocellulose particles. Middle row: depictions of pure-component assemblies of each nanoparticle type reveal differences in aggregation patterns and packing densities. Bottom row: AFM images of arabinoxylan composites with each of the nanocellulose components (AX, arabinoxylan; n-CNC, negatively charged cellulose nanocrystal; p-CNC, positively charged cellulose nanocrystal; t-CNF, TEMPO-oxidized cellulose nanofibril).

Control over the bulk materials properties and functionality of these compositions was achieved by modulating the interactions and assembly behavior of the components at the molecular-, nano-, and meso-scales. These interactions can be largely controlled by the surface chemistry of the nanocellulose components as well as the choice of the binder molecule(s). Thus, as described herein, the present disclosure provides a versatile platform of cellulose-derived particles, including nanoparticles such as cellulose fibrils and/or cellulose crystals having surface chemistries including anionic charges (negative), cationic charges (positive), and/or neutral and various chemical functionalities. Several different types of surface functionalized nanocellulose particles are depicted in FIG. 5. Glycoplastic composites were synthesized using wheat-derived arabinoxylan as a binder for nanocellulose components that included negatively charged cellulose nanocrystals, positively charged cellulose nanocrystals and TEMPO-oxidized cellulose nanofibrils. Atomic force microscopy (AFM) micrographs of the surface of the resultant composites are depicted in FIG. 5 which depicts different mesostructures in the resultant composite materials.

As described above, cyclopentenone (CP) can be used as a binder to produce a composite having cellulose particles. CP is a water soluble product produced by the pyrolysis (e.g. CFP) of biomass that is the primary carbonaceous component of the aqueous phase following condensation of bio-oil. This compound is typically considered a waste product and therefore its utilization for materials co-products valorizes the CFP process. Corresponding percent amounts of glucose (Glu) and/or CP were added to the negatively/positively charged cellulose nanocrystal (NCNC/PCNC, 3 wt %, 2 mL) and negatively/positively charged cellulose nanofibril (NCNF/PCNF, 1 wt %, 2 mL). The mixtures were then stirred at room temperature for 1 h and dispensed into molded polystyrene Petri dish to prepare rectangular specimens of 40 mm×10 mm (length×width). Evaporation (typically 24 h) in ambient conditions gave composite films designated as CNC, CNF, CNC+Glu, CNC+Glu+CP and CNF+Glu+CP, respectively. Reported glucose and cyclopentenone concentrations from the composite films were calculated by weight of CNC.

Figure 6:
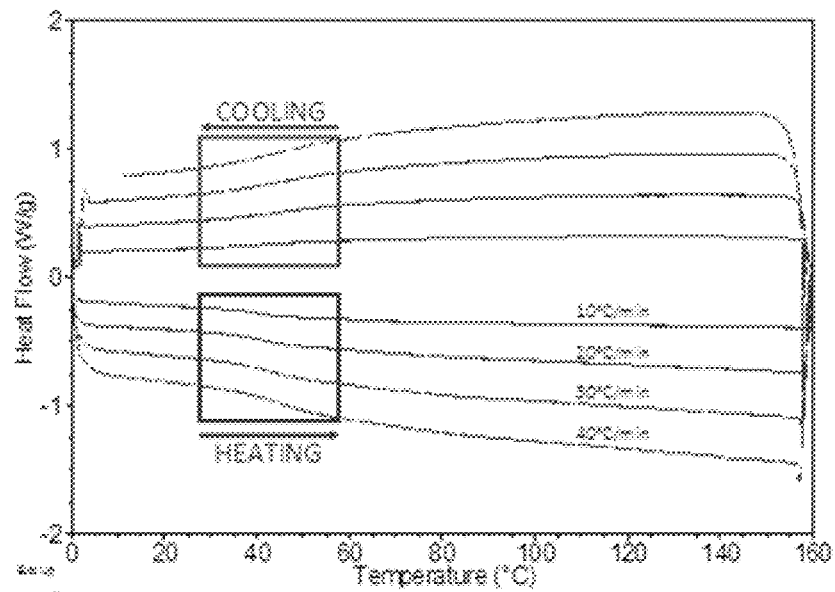
FIG. 6 depicts DSC scans at various ramp rates performed on a PCNC (Panel A) and PCNF (Panel B), according to some embodiments of the present disclosure.
Figure 6:
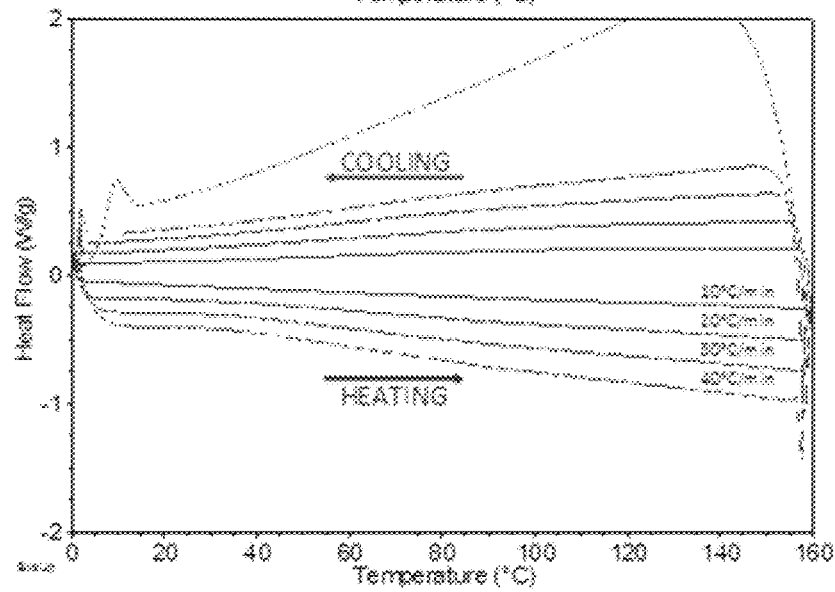

Dynamic scanning calorimetry (DSC) analysis was performed on both CNC and CNF films using a TA Q1000 differential scanning calorimeter (TA Instruments). The composite films were loaded in aluminum DSC standard pans and held at 160° C. for 10 min to anneal the material and drive off water. The films were then subjected to four heating-cooling cycles at discrete, linearly increasing ramp rates between 10-40° C./min. For the CNC films, the heat flow curves for the films exhibit a consistent phase change behavior indicated by an endothermic and exothermic inflection point for the heating and cooling cycles, respectively, as shown in Panel A of FIG. 6. The inflection point was observed at the same temperature for heating and cooling while the magnitude of the change increased with increasing ramp rate. The phase change was observed in both PCNC and NCNC films; however, no inflection point was observed for any of the CNF films, as shown in Panel B of FIG. 6.

Figure 7:
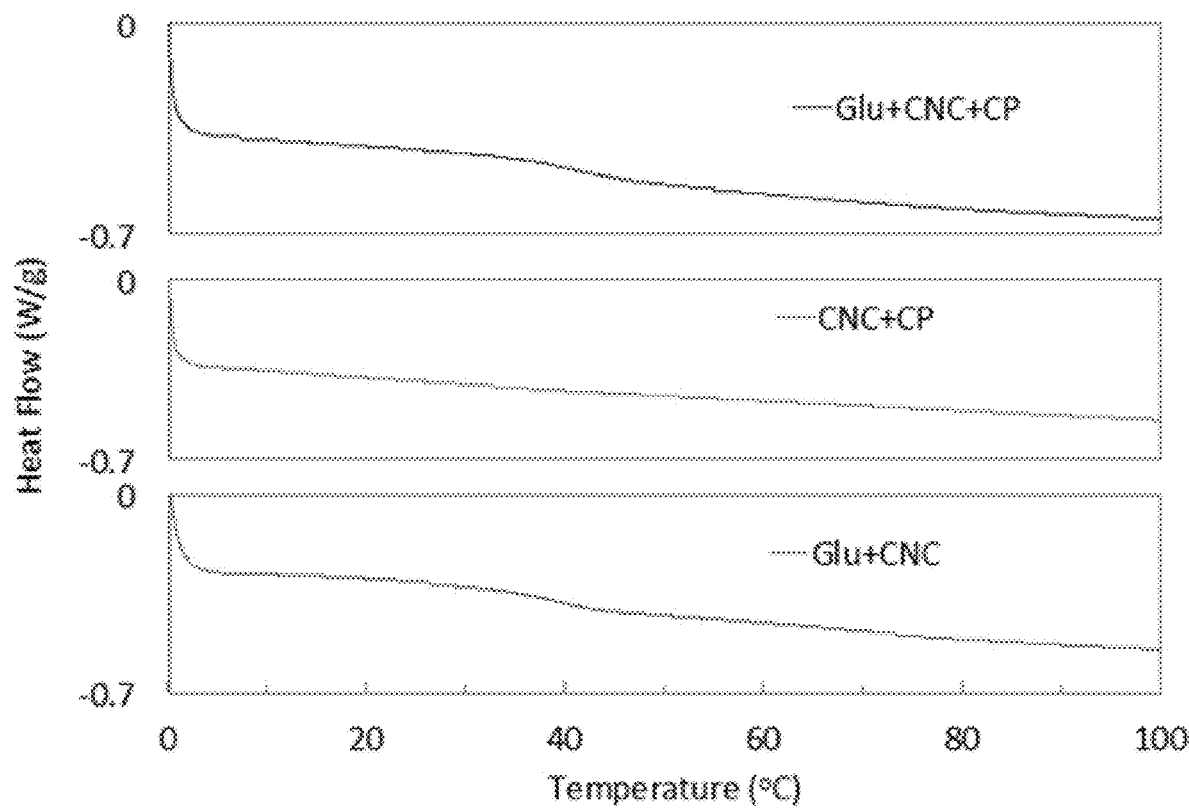
FIG. 7 depicts DSC heating scans at 20° C./min for three films containing different combinations of components, according to some embodiments of the present disclosure.

To elucidate the combinatorial effects of each component on the transition behavior, three films containing different components were formulated: (1) glucose, CNC and CP (Glu+CNC+CP); (2) CNC and CP (CNC+CP); and (3) glucose and CNC (Glu+CNC). The three films were subjected to the same DSC process previously described. FIG. 7 shows the resulting heating cycle from the DSC scans. A phase transition is observed for both Glu+CNC+CP and for Glu+CNC films and the transition is not present for the CNC+CP films. Without being bound by theory, this indicates the transition is a function of the interaction between glucose and CNC. Since there was no observed transition for CNFs this indicates that the interaction is only present for cellulose crystals and not cellulose fibrils.

Figure 8:
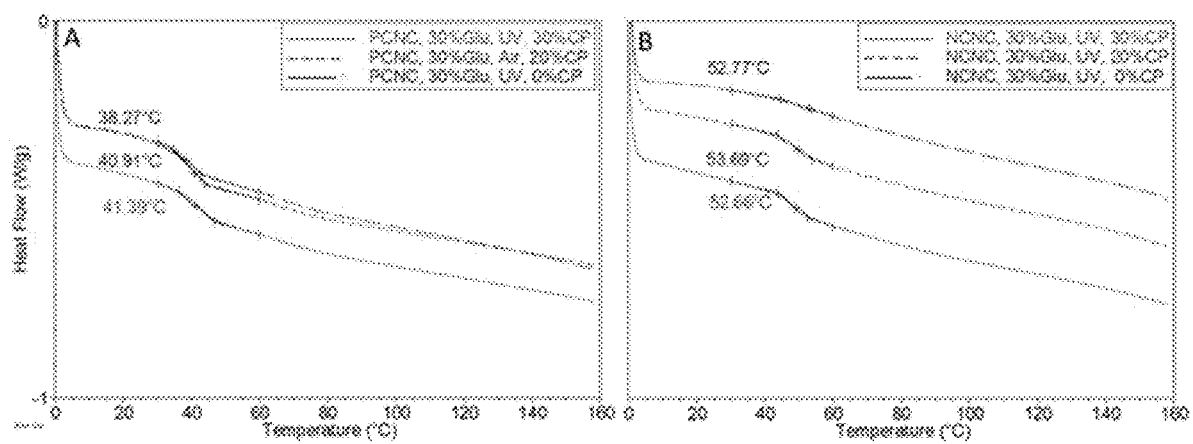
FIG. 8 depicts in Panel A DSC heating scans at 20° C./min for three PCNC films with 30% glucose and 0, 5 and 20% cyclopentenone, and in Panel B DSC heating scans at 20° C./min for three NCNC films with 30% glucose and 0%, 5% and 20% cyclopentenone, according to some embodiments of the present disclosure.

DSC scans of increasing CP composition for both positive and negative films are shown in FIG. 8. These scans reveal that the charge of the CNC influences the temperature of the phase transition with the resulting inflection points at 40.2±4.2° C. and 53.0±1.4° C. for positive and negative films, respectively (error is reported as 95% confidence intervals). Conversely, increasing cyclopentenone composition does not affect the transition temperature.

Figure 9:
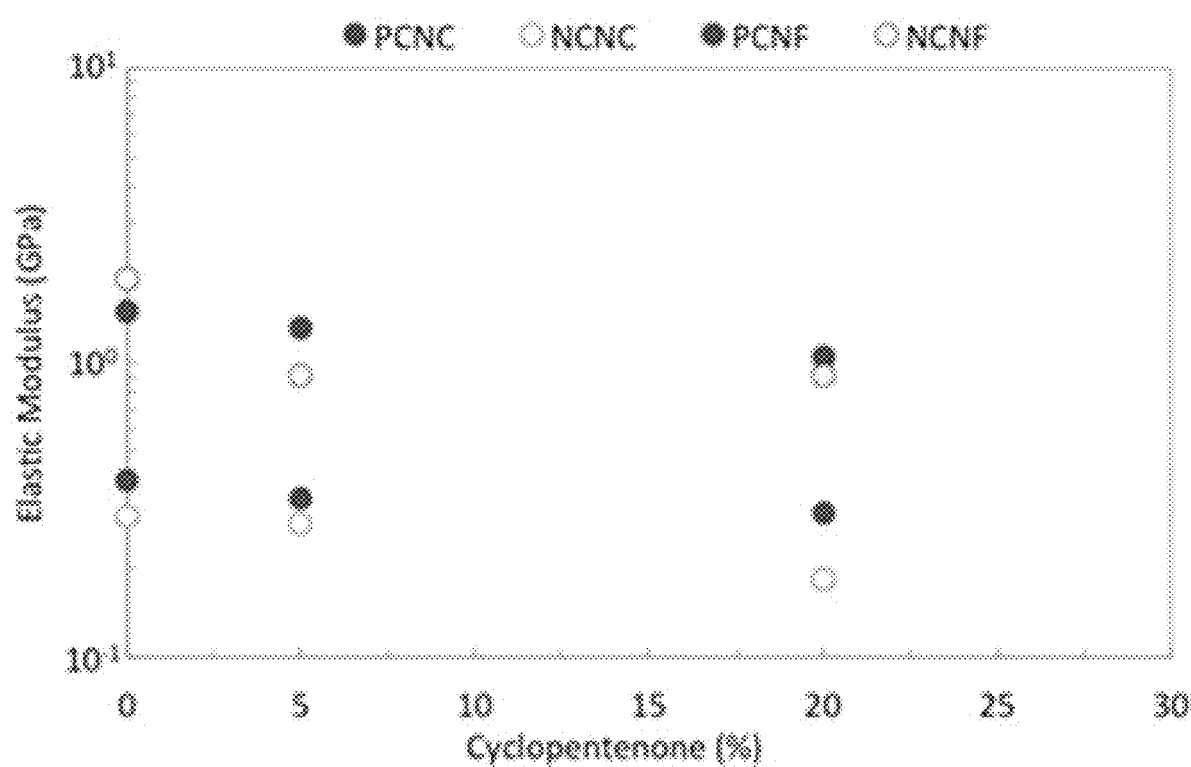
FIG. 9 depicts elastic modulus as a function of cyclopentenone composition and charge for both CNC and CNF 30% glucose, according to some embodiments of the present disclosure.

Elastic modulus and tensile testing was performed on both CNC and CNF films in which the composition of cyclopentenone was varied at values of 0, 5 and 20%. Testing was performed using the Controlled Force Strain Rate Mode on the Q800 dynamic mechanical analysis system (TA Instruments). Increasing stress was applied to the films at a rate of 0.5N/min until failure, and temperature was maintained at 30° C. The elastic modulus was taken as the linear region of the resulting stress-strain curve from 0 up to 2% strain. The resulting moduli are shown as a function of cyclopentenone percent in FIG. 9. From the trends it is apparent that the NCNC films exhibit a lower elastic modulus than the PCNC films. This trend is also observed in the CNF films with the exception of the 0% CP film. Additionally, there is an inversely proportional correlation between elastic modulus and cyclopentenone composition observed in both CNC and CNF films. Without being bound by theory, the correlation is likely due to plasticization of the films related to the increasing presence of cyclopentenone. The modulus increased when using cellulose fibrils vs cellulose crystals. The difference between the two is approximately one order of magnitude. The high mechanical strength of materials formulated from cellulose fibrils has been previously noted in the literature. Table 1 lists the elastic modulus of various materials and includes the formulated films for comparison.

TABLE 1

Elastic moduli for various materials

| Material | E (GPA) |
| --- | --- |
| Polystyrene | 3.0-3.5 |
| Acrylics | 3.2 |
| Polycarbonates | 2.6 |
| PVC | 2.4-4.1 |
| Nylon-6 | 2.0-4.0 |
| PET | 2.0-2.7 |
| ABS | 1.4-3.1 |
| Polypropylene | 1.5-2.0 |
| CNF/CP | 1.0-1.7 |
| HDPE | 0.8 |
| PFTE | 0.4 |
| CNC/CP | 0.2-0.3 |
| LDPE | 0.1-0.5 |

Figure 10:
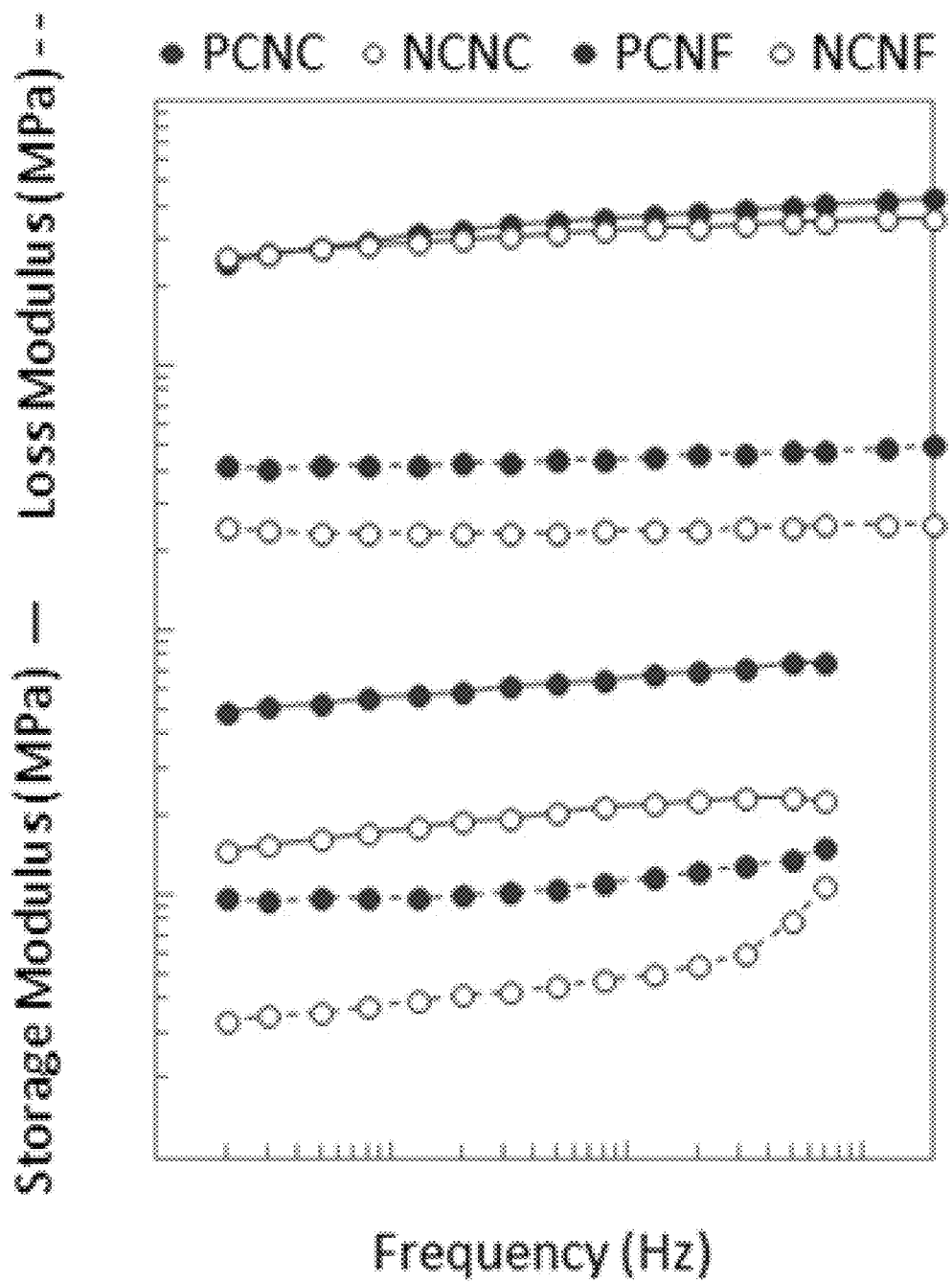
FIG. 10 depicts storage and loss modulus as a function of frequency for both positive and negative CNC/CNF films containing 30% glucose and 20% cyclopentenone, according to some embodiments of the present disclosure.

Frequency scan sweeps for both CNC and CNF films were performed to measure elastic, viscous or viscoelastic behavior. Tests were performed using the DMA Multi-Frequency-Strain Mode. The tested frequencies scanned at logarithmic intervals between 0.02 and 20 Hz; however, the CNC films ruptured in the higher frequency regime. Reported values are shown up to where the sample began to yield. FIG. 10 shows the resulting storage and loss modulus for all film formulations. Similar to the elastic modulus results from tensile testing, the positive CNC films exhibit a higher storage modulus than the negative films. The films are dominated by elastic characteristics indicated by a relatively constant storage modulus, and the loss modulus values are below the respective storage moduli for all frequencies. The absence of a loss modulus maximum indicates no phase transition over the tested frequencies. The increase in the loss modulus for the NCNC at the high frequency is likely due to the sample yielding before rupture.

Figure 11:
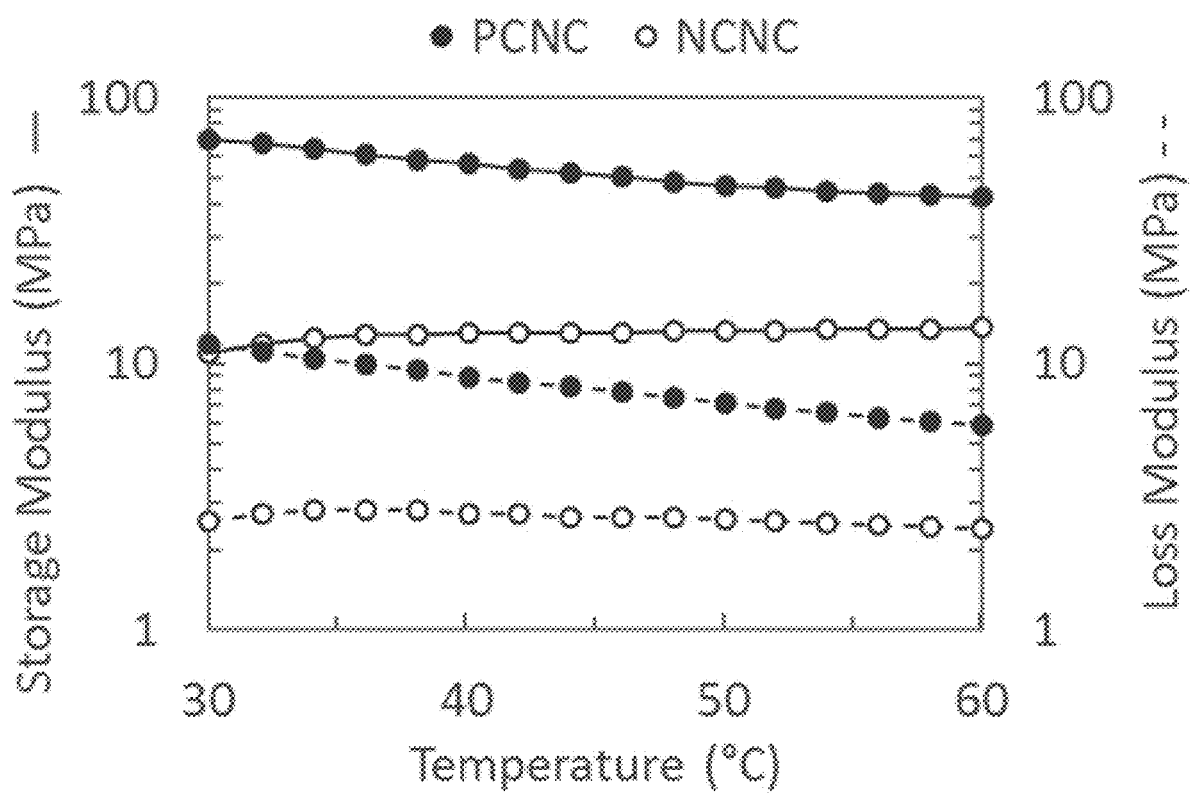
FIG. 11 depicts storage and loss modulus as a function of temperature for both positive and negative CNC films containing 30% glucose and 20% cyclopentenone, according to some embodiments of the present disclosure.

Temperature scan sweeps of CNC films were performed using the DMA Multi-Frequency-Strain Mode. Measurements were conducted at a heating rate of 2° C./min from 30 to 60° C. with an amplitude of 15 µm at a frequency of 1 Hz. FIG. 11 shows the resulting storage and loss moduli for the positive and negative films. For CNC films there was not an observed peak in the loss modulus indicative of a phase change. This is in contradiction to the results observed in the DSC data. Without being bound by theory, a possible explanation of this is the presence of water in the films during mechanical testing while water was drive out of the films for the calorimetric testing. Performing similar preconditioning of the films for mechanical testing was not possible as the removal of water results in film embrittlement, and the films subsequently rupture before any mechanical testing can be completed.

Water content of the films was determined via gravimetric interrogation of the films in hydrated and dehydrated states. Films were weighed after formulation, in the hydrated state. Subsequently, the films were placed in a vacuum oven at 21 inHg and 44° C. The films were weighed daily until no weight change from the previous measurement was observed. This was considered the dehydrated state. Water content was calculated based on Equation 1.

$$\text{Water Content} = \frac{M_H - M_D}{M_H} \quad (1)$$

Figure 12:
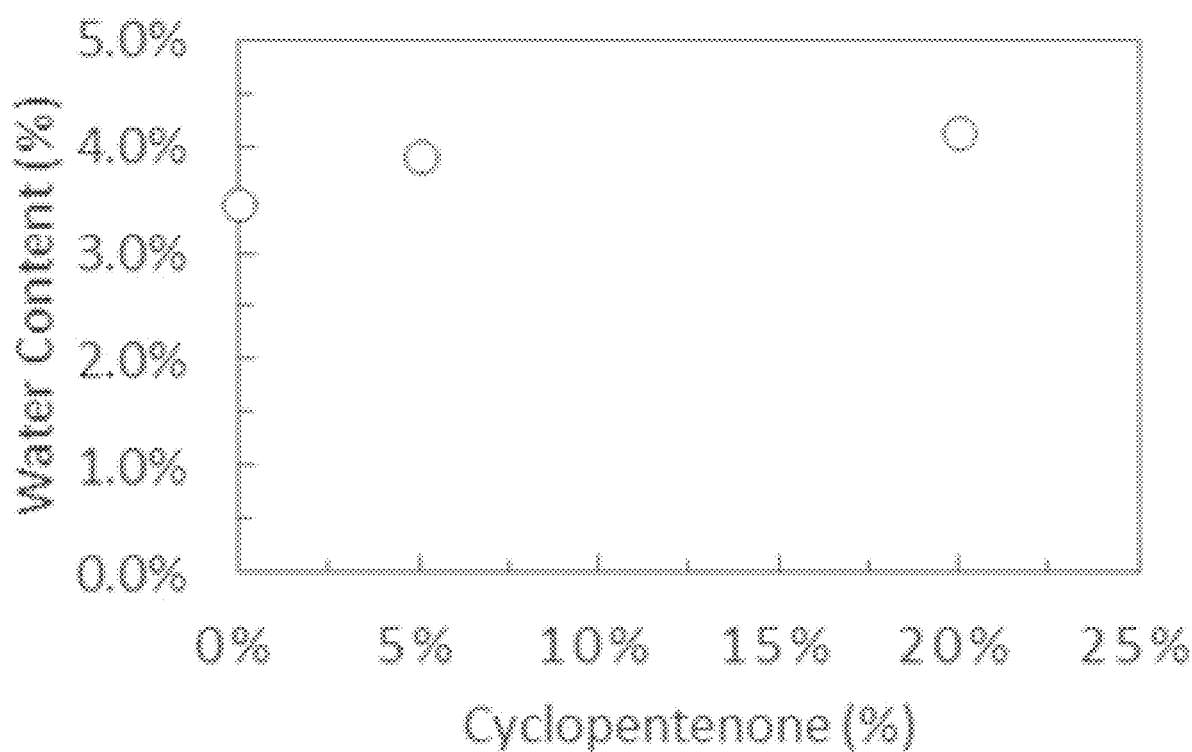
FIG. 12 depicts average water content of positive and negative CNC films as a function of cyclopentenone composition for films containing 30% glucose, according to some embodiments of the present disclosure.

As depicted in FIG. 12, an increase in the water content is observed as a function of cyclopentenone percent. This is in accordance with the tensile testing results as increasing cyclopentenone causes a decrease in elastic modulus. This decrease is likely due to plasticization of the films by imbibed water, which is facilitated by cyclopentenone, a hydrophilic molecule. In this regard, cyclopentenone is acting as a plasticization promoter by increasing the uptake of water in the films. This is further supported by the observed embrittlement of the films upon dehydration, which was seen in both DMA and water content testing.

Figure 13:
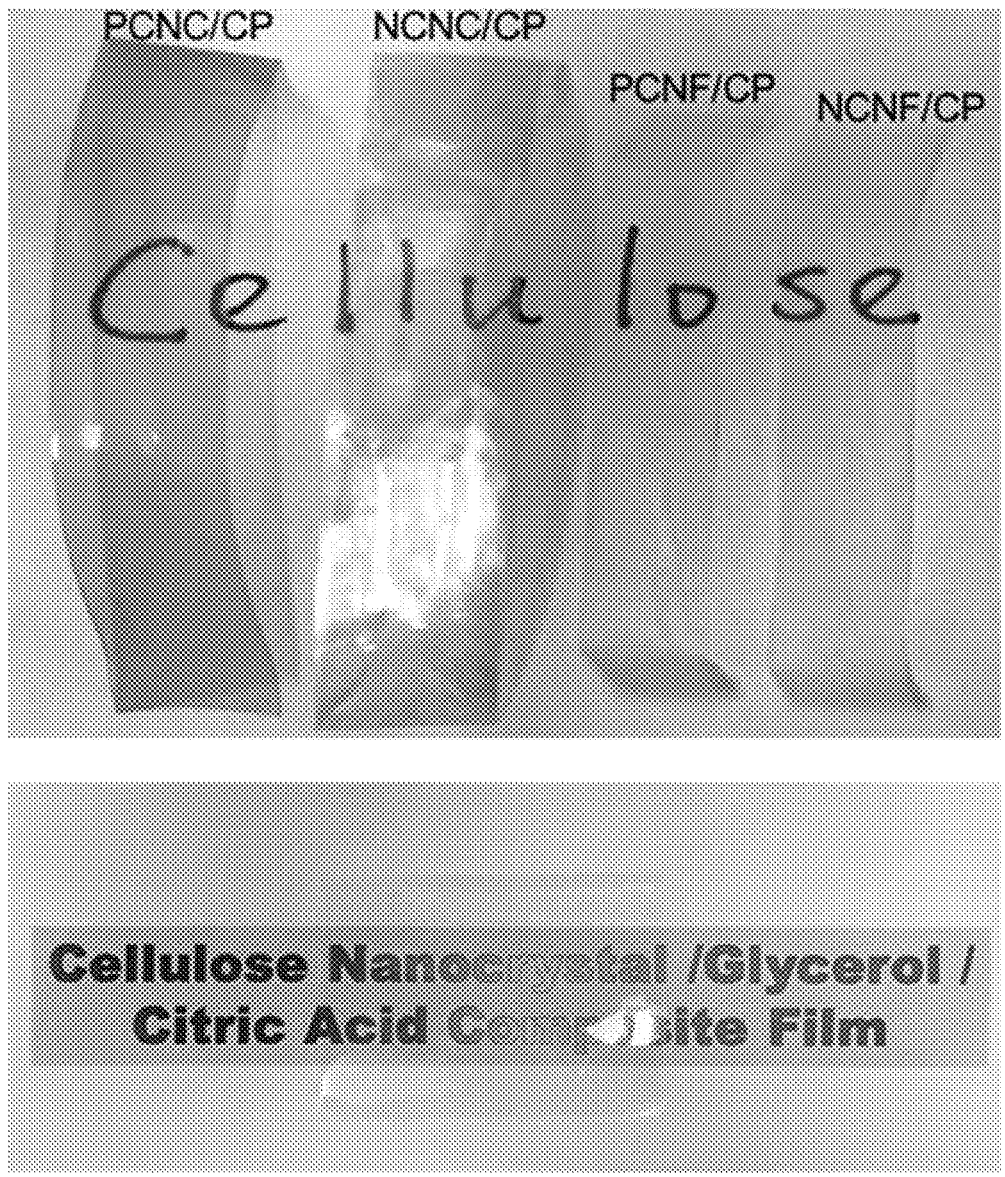
FIG. 13 depicts an optical image of nanocellulose composite films with 30 wt % glucose and 20 wt % CP, according to some embodiments of the present disclosure.
Figure 14:
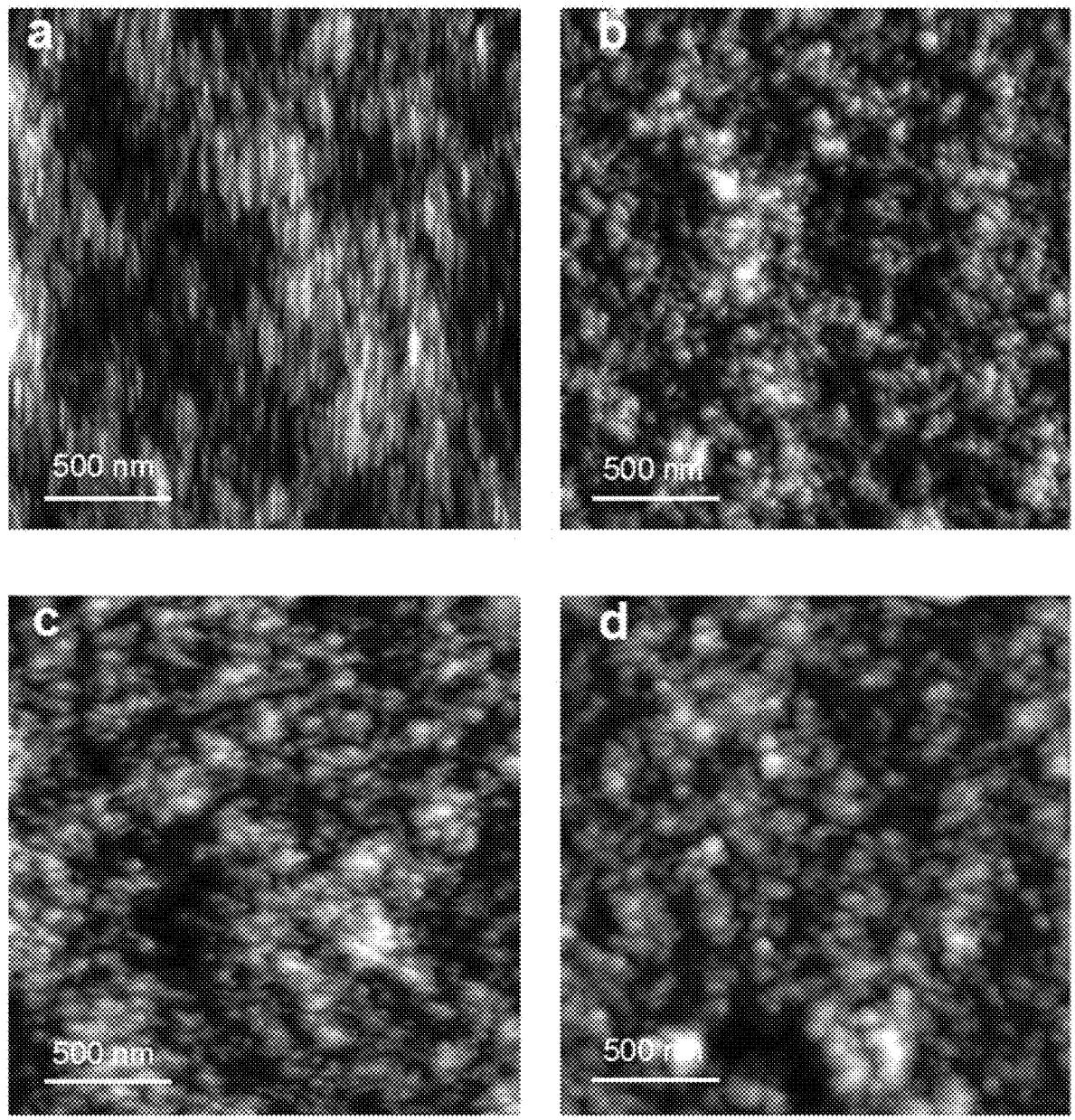
FIG. 14 depicts AFM images of CNC films (Panel A) NCNC, (Panel B) PCNC, (Panel C) NCNC+Glu30%+CP20% and (Panel D) PCNC+Glu30%+CP20%, according to some embodiments of the present disclosure.

FIG. 13 depicts images of composite films made according to embodiments of the present disclosure. Optical microscopy of the films reveal that each formulation is transparent to some degree, however significant differences are observed in the light transmission behavior of each formulation. The PCNC/CP films retain some coloration from the cyclopentenone. Surprisingly, the NCNC/CP films do not display the coloration of the CP additive and their appearance is dominated by the iridescent character typical of chiral nematic CNC films. Both CNF composite films appear similar in color but display slightly increased haze with respect to the CNC composites. Atomic force microscopy imaging of film surface morphology was done with Veeco Nanoscope multi-mode atomic force microscope in soft tapping mode. Images were collected using silicon probes (OLTESPA-R3, Bruker) on dried films deposited on the silicon wafer. FIG. 14 depicts the differences in mesoscale surface morphology of CNC composite films with regard to the surface charge of the CNCs and inclusion of matrixing materials. The pure NCNC film (FIG. 14, Panel A) displays a well-aligned assembly of rod-like CNCs, which is consistent with the hierarchical arrangement of negatively charged CNC reported previously. The pure PCNC film (FIG. 14, Panel B), however, shows more anisotropic agglomerates of cellulose particles. We attribute this morphology to the disruption of the chiral nematic behavior typical of NCNC suspensions by the addition of positive surface charges. Interactions between CNC and the added glucose/cyclopentenone lead to the surface morphological change on both NCNC and PCNC films. In FIG. 14, Panel C, the rodlike shapes of CNCs are less defined upon addition of matrixing materials than that observed in the neat NCNC film, though some long-range order is still evident in the film. The PCNC composite shown in FIG. 14, Panel D displays randomly arranged aggregates with a larger feature size than that observed form the neat PCNC film. These differences in the mesostructural arrangement of the nanocellulose particles is likely responsible for the differences in optical properties observed. The mechanical difference of resultant CNC films is analyzed by AFM imaging from a microstructure point of view.

Figure 15:
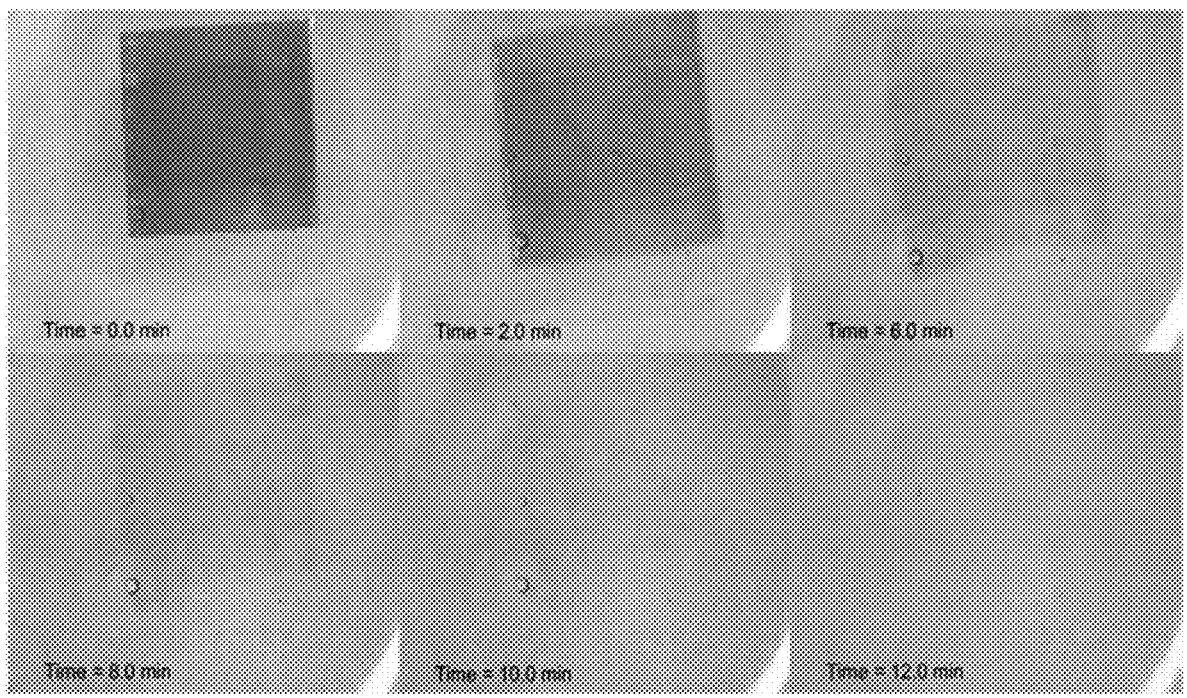
FIG. 15 depicts time-lapsed images of an NCNC/CP composite film dissolving in water at room temperature), according to some embodiments of the present disclosure. Green pigmentation was added to help visualize the dissolution process.

These composite films exhibit mechanical properties similar to polyethylene at ambient moisture content, however they dissolve when immersed in water at neutral pH at room temperature. As depicted in FIG. 15, CNC composite films dissolve completely after a period of about 10-15 minutes, while the CNF composite films dissolve on the scale of about 30 minutes and still retain some entanglement after the dissolution process.

Figure 16:
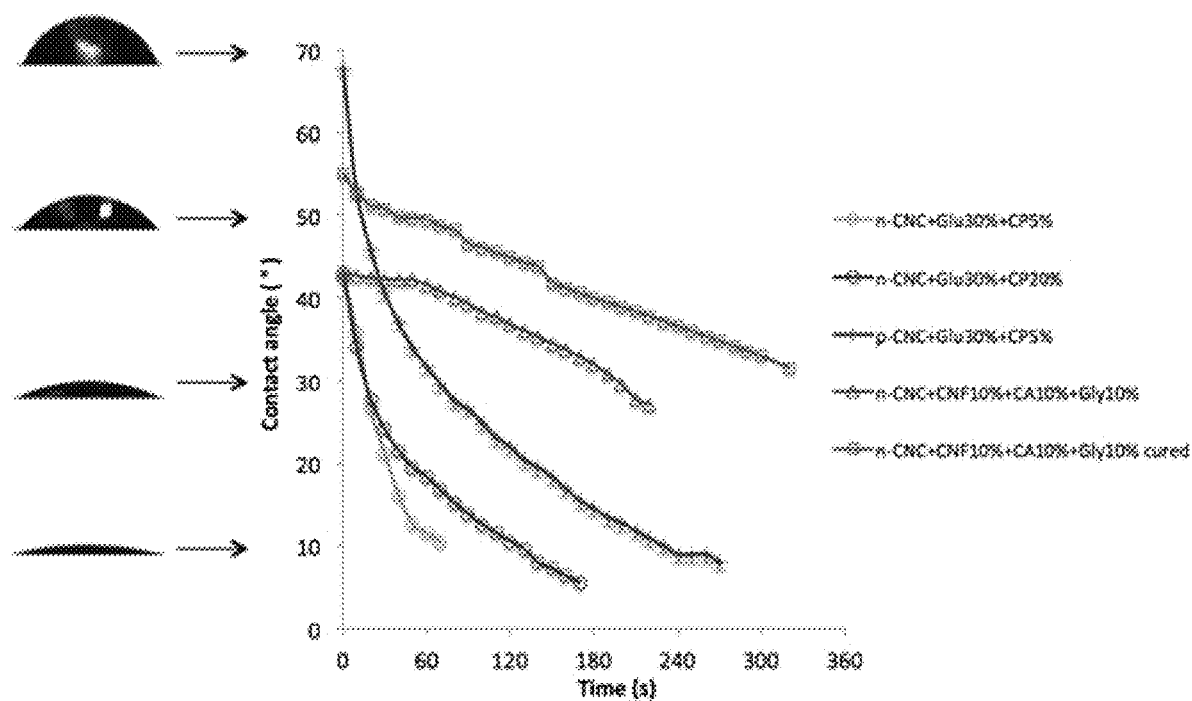
FIG. 16 depicts tunable hydrophobicity and tunable water solubility of films, demonstrated by time-resolved evolution of water contact angle, according to some embodiments of the present disclosure. (n-CNC, negatively charged cellulose nanocrystal; n-CNC, positively charged cellulose nanocrystal; Glu, glucose; CP, cyclopentenone; CNF, cellulose nanofibrils; CA, citric acid; Gly, glycerol.)

The hydrophobicity and water solubility of the film can be controlled by altering the composition and preparation methods of the film. FIG. 16 presents measurements of time resolved evolution of water contact angles on films of various compositions. The initial contact angle provides a measurement of the hydrophobicity of the film at ambient conditions, which is modulated over a range of greater than 25° as shown in FIG. 16. The rate at which the water contact angle decreases corresponds to the time required for the drop to be completely absorbed by the composite and is therefore related to the relative water solubility of the material. The contact angle evolution data presented in FIG. 16 show that the water solubility of these composites can be altered dramatically by changing the composition and preparation method of the films. For example, the n-CNC/Glu30%/CP5% composite is bound with largely electrostatic forces and dissolves rapidly in water. In contrast, the n-CNC/CNF10%/CA10%/Gly10% cured composite is bound by electrostatic forces, physical entanglement of the CNF, and covalent crosslinks introduced by the CA and therefore has substantial dissolution in water.

The foregoing discussion and examples have been presented for purposes of illustration and description. The foregoing is not intended to limit the aspects, embodiments, or configurations to the form or forms disclosed herein. In the foregoing detailed description for example, various features of the aspects, embodiments, or configurations are grouped together in one or more embodiments, configurations, or aspects for the purpose of streamlining the disclosure. The features of the aspects, embodiments, or configurations, can be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention can encompass one or more of the conventional technical aspects discussed herein. Thus, the following claims are hereby incorporated into this detailed description, with each claim standing on its own as a separate aspect, embodiment, or configuration.

What is claimed is:

1. A method comprising:
   mixing a cellulose particle, a binder, and a nonpolar solvent to produce a solution; and treating the solution such that at least a portion of the solvent is removed to produce a film comprising the cellulose particle and the binder; and wherein the solvent is selected from the group consisting of an alkane or benzene.

2. The method of claim 1, wherein the solvent is selected such that the cellulose particle and the binder are at least partially soluble in the solvent.

3. The method of claim 1, wherein the treating comprises evaporating the solvent.

4. The method of claim 3, wherein the evaporating is performed at a temperature greater than about 20° C.

5. The method of claim 4, wherein the evaporating is performed at a temperature between about 20° C. and about 250° C.

* * * * *